(12) United States Patent
Frey et al.

(10) Patent No.: US 7,412,720 B1
(45) Date of Patent: Aug. 12, 2008

(54) DELEGATED AUTHENTICATION USING A GENERIC APPLICATION-LAYER NETWORK PROTOCOL

(75) Inventors: Bridget J. Frey, San Francisco, CA (US); Michael Wei-Chin Young, Oakland, CA (US)

(73) Assignee: BEA Systems, Inc., San Jose, CA (US)

( * ) Notice: Subject to any disclaimer, the term of this patent is extended or adjusted under 35 U.S.C. 154(b) by 721 days.

(21) Appl. No.: 10/004,301

(22) Filed: Nov. 2, 2001

(51) Int. Cl.
*G06F 7/04* (2006.01)
*G06F 7/58* (2006.01)
*G06F 15/16* (2006.01)
*G06F 17/30* (2006.01)
*G06K 9/00* (2006.01)
*G06K 19/00* (2006.01)
*H04L 9/32* (2006.01)

(52) U.S. Cl. .......................................................... 726/8
(58) Field of Classification Search ................ 713/201; 709/225; 726/27, 28, 3, 4, 8
See application file for complete search history.

(56) References Cited

U.S. PATENT DOCUMENTS

| | | | | |
|---|---|---|---|---|
| 5,241,594 A | * | 8/1993 | Kung | 713/151 |
| 5,444,850 A | * | 8/1995 | Chang | 709/222 |
| 5,493,614 A | | 2/1996 | Chaum | |
| 5,657,388 A | * | 8/1997 | Weiss | 713/185 |
| 5,680,547 A | * | 10/1997 | Chang | 709/222 |
| 5,684,950 A | * | 11/1997 | Dare et al. | 726/10 |
| 5,754,755 A | | 5/1998 | Smith, Jr. | |
| 5,768,503 A | * | 6/1998 | Olkin | 726/5 |
| 5,768,504 A | * | 6/1998 | Kells et al. | 713/201 |
| 5,781,724 A | * | 7/1998 | Nevarez et al. | 726/17 |
| 5,819,271 A | | 10/1998 | Mahoney et al. | |
| 5,894,554 A | | 4/1999 | Lowery et al. | |
| 5,907,837 A | | 5/1999 | Ferrel et al. | |
| 5,935,251 A | * | 8/1999 | Moore | 726/18 |
| 5,944,824 A | * | 8/1999 | He | 713/201 |
| 5,974,445 A | | 10/1999 | Pivnichny et al. | |
| 6,014,137 A | | 1/2000 | Burns | |
| 6,014,638 A | | 1/2000 | Burge et al. | |
| 6,026,433 A | | 2/2000 | D'Arlach et al. | |
| 6,065,120 A | | 5/2000 | Laursen et al. | |

(Continued)

OTHER PUBLICATIONS

Vipin Samar, Single sign-on using cookies for Web applications, 1999, Enabling Technologies: Infrastructure for Collaborative Enterprises, 1999. (WET ICE '99) Proceedings. IEEE 8th International Workshops on, Vol., Iss., 1999, pp. 158-163.*

(Continued)

*Primary Examiner*—Nasser Moazzami
*Assistant Examiner*—David Garcia Cervetti
(74) *Attorney, Agent, or Firm*—SF Bay Area Patents, LLC; Andrew V. Smith

(57) ABSTRACT

A method, apparatus, and computer-readable media include receiving a signal representing a request from a remote user for a secure resource residing on a network employing a generic application-layer network protocol; determining, without the intervention of the user, the type of security credential required to access the secure resource; and sending a signal representing a second request to the secure resource, the second request including a security credential for the user of the type required to access the secure resource.

67 Claims, 11 Drawing Sheets

U.S. PATENT DOCUMENTS

| | | | |
|---|---|---|---|
| 6,085,030 A * | 7/2000 | Whitehead et al. | 709/203 |
| 6,085,168 A | 7/2000 | Mori et al. | |
| 6,112,192 A | 8/2000 | Capek et al. | |
| 6,128,663 A | 10/2000 | Thomas | |
| 6,134,548 A | 10/2000 | Gottsman et al. | |
| 6,134,658 A | 10/2000 | Multerer et al. | |
| 6,158,007 A * | 12/2000 | Moreh et al. | 726/1 |
| 6,158,010 A * | 12/2000 | Moriconi et al. | 713/201 |
| 6,161,126 A | 12/2000 | Wies et al. | |
| 6,178,511 B1 * | 1/2001 | Cohen et al. | 713/201 |
| 6,185,316 B1 * | 2/2001 | Buffam | 382/115 |
| 6,185,614 B1 | 2/2001 | Cuomo et al. | |
| 6,240,512 B1 * | 5/2001 | Fang et al. | 713/150 |
| 6,243,816 B1 * | 6/2001 | Fang et al. | 713/202 |
| 6,256,737 B1 * | 7/2001 | Bianco et al. | 713/186 |
| 6,275,941 B1 * | 8/2001 | Saito et al. | 713/201 |
| 6,275,944 B1 * | 8/2001 | Kao et al. | 713/202 |
| 6,317,838 B1 * | 11/2001 | Baize | 726/11 |
| 6,327,628 B1 | 12/2001 | Anuff et al. | |
| 6,327,659 B2 * | 12/2001 | Boroditsky et al. | 713/182 |
| 6,332,192 B1 * | 12/2001 | Boroditsky et al. | 713/168 |
| 6,405,219 B2 * | 6/2002 | Saether et al. | 707/201 |
| 6,460,141 B1 * | 10/2002 | Olden | 726/4 |
| 6,473,802 B2 * | 10/2002 | Masters | 709/229 |
| 6,532,451 B1 * | 3/2003 | Schell et al. | 705/54 |
| 6,539,382 B1 * | 3/2003 | Byrne et al. | 707/10 |
| 6,556,995 B1 * | 4/2003 | Child et al. | 707/9 |
| 6,557,039 B1 * | 4/2003 | Leong et al. | 709/229 |
| 6,609,198 B1 * | 8/2003 | Wood et al. | 713/201 |
| 6,629,246 B1 * | 9/2003 | Gadi | 713/201 |
| 6,651,168 B1 * | 11/2003 | Kao et al. | 713/185 |
| 6,668,322 B1 * | 12/2003 | Wood et al. | 713/201 |
| 6,691,232 B1 * | 2/2004 | Wood et al. | 713/201 |
| 6,704,873 B1 * | 3/2004 | Underwood | 713/201 |
| 6,735,310 B1 * | 5/2004 | Hsing et al. | 380/28 |
| 6,801,946 B1 * | 10/2004 | Child et al. | 709/230 |
| 6,807,577 B1 * | 10/2004 | Gillespie et al. | 709/227 |
| 6,812,938 B2 * | 11/2004 | Pinnell | 715/741 |
| 6,826,692 B1 * | 11/2004 | White | 713/201 |
| 6,826,696 B1 * | 11/2004 | Chawla et al. | 713/201 |
| 6,826,698 B1 * | 11/2004 | Minkin et al. | 726/1 |
| 6,836,845 B1 * | 12/2004 | Lennie et al. | 713/181 |
| 6,892,307 B1 * | 5/2005 | Wood et al. | 726/8 |
| 6,898,577 B1 * | 5/2005 | Johnson | 705/51 |
| 6,931,532 B1 * | 8/2005 | Davis et al. | 713/167 |
| 6,938,158 B2 * | 8/2005 | Azuma | 713/182 |
| 6,954,736 B2 * | 10/2005 | Menninger et al. | 705/28 |
| 6,954,792 B2 * | 10/2005 | Kang et al. | 709/229 |
| 6,954,799 B2 * | 10/2005 | Lerner | 709/240 |
| 6,961,776 B1 * | 11/2005 | Buckingham et al. | 709/229 |
| 6,971,005 B1 * | 11/2005 | Henry et al. | 713/155 |
| 6,993,596 B2 * | 1/2006 | Hinton et al. | 709/250 |
| 7,010,582 B1 * | 3/2006 | Cheng et al. | 709/219 |
| 7,016,875 B1 * | 3/2006 | Steele et al. | 705/44 |
| 7,039,804 B2 * | 5/2006 | Fichtner et al. | 713/169 |
| 7,055,032 B2 * | 5/2006 | Sandhu et al. | 713/171 |
| 7,080,077 B2 * | 7/2006 | Ramamurthy et al. | 707/9 |
| 7,136,996 B2 * | 11/2006 | Aoshima et al. | 713/155 |
| 7,137,006 B1 * | 11/2006 | Grandcolas et al. | 713/180 |
| 2001/0044894 A1 * | 11/2001 | Saito et al. | 713/156 |
| 2002/0112083 A1 * | 8/2002 | Joshi et al. | 709/248 |
| 2003/0037131 A1 * | 2/2003 | Verma | 709/223 |
| 2003/0074580 A1 * | 4/2003 | Knouse et al. | 713/201 |
| 2003/0172090 A1 | 9/2003 | Asunmaa et al. | |
| 2003/0172269 A1 | 9/2003 | Newcombe | |
| 2004/0078571 A1 | 4/2004 | Haverinen | |
| 2005/0074126 A1 | 4/2005 | Stanko | |

OTHER PUBLICATIONS

Andrej Volchkov, Revisiting single sign-on: a pragmatic approach in a new context, IT Professional, vol. 3, Iss. 1, Jan./Feb. 2001, pp. 39-45☐☐.*

Philip Carden, The New Face of Single Sign-On, Network Computing, Mar. 22, 1999.*

Hsu et al., WebSphere and Domino single sign-on, Jan. 2001, IBM, <http://www-128.ibm.com/developerworks/ibm/library/it-0101art2/>, accessed Jan. 17, 2006.*

IBM, IBM Global Sign-On for Multiplatforms, Version 1.5: A Secure Single Sign-on Solution Updated for AIX, Windows NT, and Sun Solaris, Jan. 1998.*

IBM, Secured Single Signon in a client/server environment, Aug. 1994, <http://www.redbooks.ibm.com/abstracts/gg244282.html>.*

Rodriguez et al., An Introduction to IBM WebSphere Everyplace Suite Version 1.1 Accessing Web and Enterprise Applications, Oct. 2000, IBM Redbooks, <http://www.redbooks.ibm.com/redbooks/pdfs/sg245995.pdf>, accessed Jan. 17, 2006, chapters 1-7.*

O'Mahony et al., "Electronic Payment Systems," 1997, pp. 221-228, Artech House, Inc., US.

O'Mahony et al., "Electronic Payment Systems," 1977, pp. 226-227, ISBN 0-89006-925, Artech House, Inc., US.

Method for Providing Personalized Information on the Web, IBM TDB, Oct. 1997, vol. 40, No. 10, pp. 3-6.

Medvinsky A., et al., Public Key Utilizing Tickets for Application Servers (PKTAPP), Mar. 1998, http:www.ietf.org/internet-drafts/draft-ieft-cat-kerberos-pk-tapp-03.txt, pp. 1-6.

Kerberos Papers and Documentation, http://web.mit.edu/kerberos/www/papers.html 2000, accessed 2002.

T. Dierks, et al., The TLS Protocol Version 1.0, http://www.ietf.org/rfc/rfc2246.txt, Jan. 1999.

Microsoft Passport Technical White Paper, Mar. 2001, http://www.passport.com/downloads/TechnicalWhitePaper.doc.

Netegrity SiteMinder® 5.0, http://www.netegrity.com/products/index.cfm?leveltwo=SiteMinder, 2002.

IBM Tivoli Access Manager for Business Integration, http://www.tivoli.com/products/index/access-mgr-bus-integration/, 2002.

IBM Tivoli Access Manager for e-business, http://www.tivoli.com/products/index/access-mgr-e-bus/, 2002.

IBM Tivoli Access Manager for Operating Systems, http://www.tivoli.com/products/index/access-mgr-operating-sys/, 2002.

Oblix NetPoint™ Product Description, http://www.oblix.com/products/netpoint/net_description.html, 2002.

RSA ClearTrust Web Access Management for Secure e-Business, http://www.rsasecurity.com/products/cleartrust/, 2002.

Baltimore SelectAccess Introducing SelectAccess 5.0, http://www.baltimore.com/selectaccess/index.asp, 2002.

* cited by examiner

DELEGATED AUTHENTICATION USING A GENERIC APPLICATION-LAYER NETWORK PROTOCOL

BACKGROUND

This disclosure relates generally to information retrieval and distribution systems. More specifically, it relates to a method and system for assembling and distributing content components generated by multiple resource servers having diverse authentication requirements.

It is common for today's enterprise networks to comprise scattered arrangements of different hardware and software systems. This is due to the ever-changing data management needs of corporate enterprises, and to continuing advances in the computing hardware and software available to meet those needs. Commonly, different entities within an enterprise (for example, different departments or work sites) have disparate software applications, groupware systems, or data maintenance architectures/procedures, such that information created or maintained by one entity is not usable by another entity.

Corporate portals, also referred to as intranet portals, have been introduced to increase the accessibility and usability of information stored across the heterogeneous systems of an enterprise network. A corporate portal, which is usually overlaid onto an existing enterprise network, is designed to extract content from disparate systems on the enterprise network and to allow easier, personalized access to that content by end users. It is to be appreciated that while the features and advantages of the implementations described herein are particularly advantageous for corporate portal environments, enhancing their speed, openness, scalability, and stability, the features and advantages of the implementations are also applicable in other environments, such as with personalized "Web portals" that serve broad user bases. By way of example and not by way of limitation, one example of a corporate portal is the Plumtree Corporate Portal available from Plumtree Software, Inc. of San Francisco, California, while examples of personalized Web portals are typified by the MyYahoo! resource from Yahoo, Inc. of Sunnyvale, California and MyExcite from At Home Corp. of Redwood City, Calif. Corporate portals are also described in commonly assigned U.S. Ser. No. 09/896,039, filed Jun. 29, 2001, which is incorporated by reference herein.

FIG. 1 shows a simplified view of an exemplary user screen 102 associated with a corporate portal system, comprising a plurality of content components 104-110. A content component refers to any content that is assembled, along with other content components, into a unified body of content. In the example of FIG. 1, a company news content component 104 includes an HTML display of news that is extracted, for example, from one or more company news servers, and arranged for display to the end user. A company stock quote content component 106 comprises an HTML display of a stock quote for the company and its competition that is extracted, for example, from a stock quote server. Also shown in FIG. 1 is an email content component 108 and a customer relationship management (CRM) content component 110. According to the end user's ID 112, the corporate portal displays the content components 104-110 in a personalized arrangement (for example, news at the upper left, company stock quote in the upper right, and so on) and also selects the information within each content component based on the user's ID (for example, showing the user's personal e-mail account only, showing sports news on top of world news, showing only the user's personal CRM information, and so on). The user screen 102 of FIG. 1 would typically appear after the user (Jane Smith) has logged into the corporate portal system by supplying a user name and password.

More generally, the content components themselves can be any information communicable via any generic application-layer network protocol such as Hypertext Transfer Protocol (HTTP), Secure Hypertext Transfer Protocol (HTTPS), File Transfer Protocol (FTP), Wireless Application Protocol (WAP), and the like. Information communicable via a network includes text information, image information, Extensible Markup Language (XML), Hypertext Markup Language (HTML), or any other type of information that can be stored in a computer file, including images, sounds, and video. Throughout this specification we refer to any information sent over a network as content. We use the term content component to refer to any content that is assembled, along with other content components, into a unified body of content.

An exemplary content component is the HTML output generated by a script that communicates with an email client application. An email client application sends and receives email. Such applications usually let users compose email, and store email addresses in an address book. This script provides an HTML interface to the email client application. This script is hosted by the computer hosting the email application. This script generates HTML displaying the user's email messages, along with HTML allowing the user to compose and send email messages. This script can communicate with the email application through the application's programming interface. In this example, the HTML generated by the script is the content component (see, for example, FIG. 1, content component 108).

Other exemplary content components are two types of HTML generated by a program that communicates with a database application. This program can be hosted by the same computer hosting the database application. The database application stores and maintains a database of information organized into records. This program can communicate with the database application via the application's interface. This program generates HTML that allows the user to search for database records. For this case, the content component is a query box. This program also generates HTML that displays database records to the user. For this case, the content component is a view of the database records (see, for example, FIG. 1, content component 110). Further examples of content components include, but are not limited to, resources generated by a calendar application, a workflow application, a database storing proprietary personal information, a database storing proprietary business information, a database storing secure personal information, a database storing secure business information, an e-business application, and the like.

Content components are obtained from servers referred to herein as "resource servers." In some cases, resource servers may be secure, so that security credentials are required to gain access to the content on a secure resource server. FIG. 2 shows a system 200 for delivering personalized content according to a prior art method. A plurality of secure resource servers 202-208, each protected by an authenticator 222-228, host various types of content. Each authenticator 222-228 authenticates each user before allowing access to the protected server. Referring to FIG. 2, a CRM server 202 protected by an authenticator 222 hosts content such as customer lists and customer contact information. An email server 204 protected by an authenticator 224 hosts content such as email messages for a group of users. A stock quotes server 206 protected by an authenticator 226 hosts content such as stock quotes and charts. A news server 208 protected by an authenticator 228 hosts content such as headlines and news features. A main process 216 within a Web server 210 maintains a list of the types of content available from resource servers 202-208, and advertises these types of content to users.

Users employ user terminals 218A and 218B through 218N to access Web server 210 over a network 220 such as the Internet. A user establishes personalized settings in part by selecting certain of the types of content that are advertised by Web server 210. Subsequent to this personalization step, the user sends a request for personalized content to Web server 210. The personalized content can include content residing upon secure resource servers. Therefore, Web server 210 must provide security credentials to each secure resource server.

According to one prior art method Web server 210 simply forces the user to supply a security credential every time a secure resource server requires one. Since remembering multiple passwords or authentication methods is difficult for many users, users often write down or forget passwords, or use the same password for all of the secure resource servers. These user reactions create potential security and management problems.

According to another prior art method Web server 210 collects and stores the user security credentials for all of the secure resource servers. Whenever a secure resource server requires a security credential, Web server 210 simply provides all of the user's security credentials to the secure resource server. While relieving the user from entering his security credentials again and again, this technique creates significant security risks. For example, one of the secure resource servers could access another of the secure resource servers by spoofing the user.

To overcome these deficiencies in the prior art, techniques referred to as "Single-Sign-On" (SSO) have recently been developed. SSO techniques allow a user to access computers and systems to which he has permission through a single action, without the need to enter multiple passwords. One such technique is Kerberos, which allows a user to delegate authentication functions to another entity, such as Web server 210. One significant disadvantage of kerberos is that it does not support generic application-layer protocols, such as hypertext transfer protocol (HTTP) or file transfer protocol (FTP). Therefore a user cannot use Kerberos through a standard Web browser, such as Microsoft Internet Explorer or Netscape Navigator, without significant modification to the browser.

Some commercially-available off-the-shelf SSO products, such as Netegrity Siteminder and Securant Cleartrust, employ HTTP as the application-layer protocol, and so are compatible with unmodified browsers. When a user first visits a web site employing this type of SSO product, the web site authenticates the user and then gives the user browser a token, such as a session cookie, that allows the user to access any other web site that is guarded by the same SSO product without going through the original web site or authenticating again. One disadvantage of such SSO products is that they work only with other SSO products. A token from one SSO product will not provide access to a secure web site that does not employ that SSO product.

Another prior art solution is Microsoft Passport, which provides a single authenticator, controlled by Microsoft. According to Passport, the secure resource server shares a secret key with the Microsoft Passport Authenticator. One disadvantage of Passport is that, in order to share a private key with the Microsoft Passport Authenticator, each secure resource server must enter a business relationship with Microsoft.

Another prior art solution is represented by the capability of some browsers to store a security credential required by a Web site, and to forward the security credential to the Web site automatically when the user directs the browser to that Web site. Such security credentials can include session cookies, persistent cookies, and digital certificates. One disadvantage of this approach is that it is not portable. In order to use this approach on a second computer, the user must install the credentials on that computer as well. In addition, if the second computer is available to other users, the credentials must be removed when the session ends to prevent a security breach.

SUMMARY

In general, in one aspect, a method, apparatus, and computer-readable media include receiving a signal representing a request from a remote user for a secure resource residing on a network employing a generic application-layer network protocol; determining, without the intervention of the user, the type of security credential required to access the secure resource; and sending a signal representing a second request to the secure resource, the second request including a security credential for the user of the type required to access the secure resource.

Particular implementations can include one or more of the following features. Particular implementations include authenticating the user before sending the signal representing the second request. Particular implementations include receiving a signal representing a response to the second request; and sending a signal representing a result to the remote user, the result based on the response to the second request. The request includes a logon credential for the remote user, and particular implementations include authenticating the remote user based on the logon credential before sending the second request. The request includes a logon credential for the remote user and the type of security credential required to access the secure resource includes the logon credential, and particular implementations include sending the signal representing the second request to the secure resource, the second request including the logon credential. The request includes a logon credential for the remote user, and particular implementations include receiving a signal representing a single-sign-on (SSO) credential generated by a SSO provider based on the logon credential; and sending a signal representing the SSO credential to the secure resource when the type of credential required to access the secure resource includes the SSO credential. Particular implementations include sending a signal representing the SSO credential to the secure resource when the type of credential required to access the secure resource includes a second SSO token corresponding to a second SSO provider having a trust relationship with a first SSO provider corresponding to the SSO token. Particular implementations include receiving a signal representing a second SSO credential generated by a second SSO provider based on the first SSO credential; and sending a signal representing the second SSO credential to the secure resource when the type of credential required to access the secure resource includes the second SSO credential. The generic application-layer network protocol is hypertext transfer protocol. Particular implementations include receiving a signal representing data in response to the second request; and sending a signal representing at least a portion of the data to the remote user. The Web resource includes a Web site, and the data is hypertext mark-up language. Receiving includes receiving a signal representing a request from the remote user for a second secure resource residing on the network, and particular implementations include determining, without the intervention of the user, the type of security credential required to access the second secure resource; and sending a signal representing a third request to the second secure resource, the third request including a security credential for the user of the type required to access the second secure resource; and wherein the signals representing the second and third requests are sent concurrently. The types of security credentials included in the second and third requests differ. The types of security credentials included in the second and third requests are the same. Particular implementations include receiving a signal representing the security credential from the user before receiving the signal representing the request. Particular implementations include storing the security credential at least until sending the signal representing the second request.

Advantages that can be seen in implementations of the invention include one or more of the following. A user can delegate authentication tasks to a Web server that requires only a single authentication from the user.

The details of one or more embodiments of the invention are set forth in the accompa- nying drawings and the description below. Other features, objects, and advantages of the invention will be apparent from the description and drawings, and from the claims.

DETAILED DESCRIPTION

Figure 1:
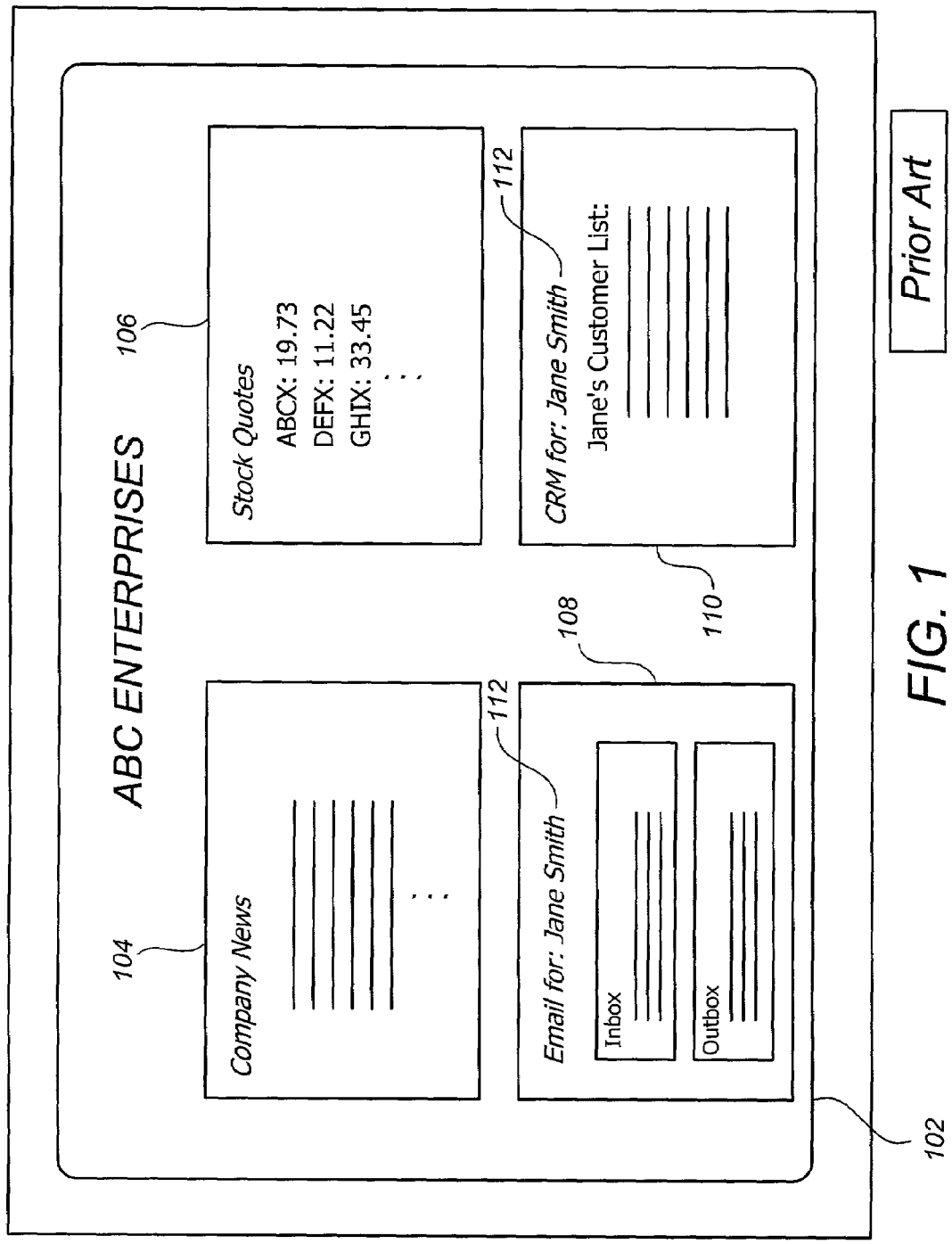
FIG. 1 shows a simplified view of an exemplary user screen associated with a corporate portal system, comprising a plurality of content components.
Figure 2:
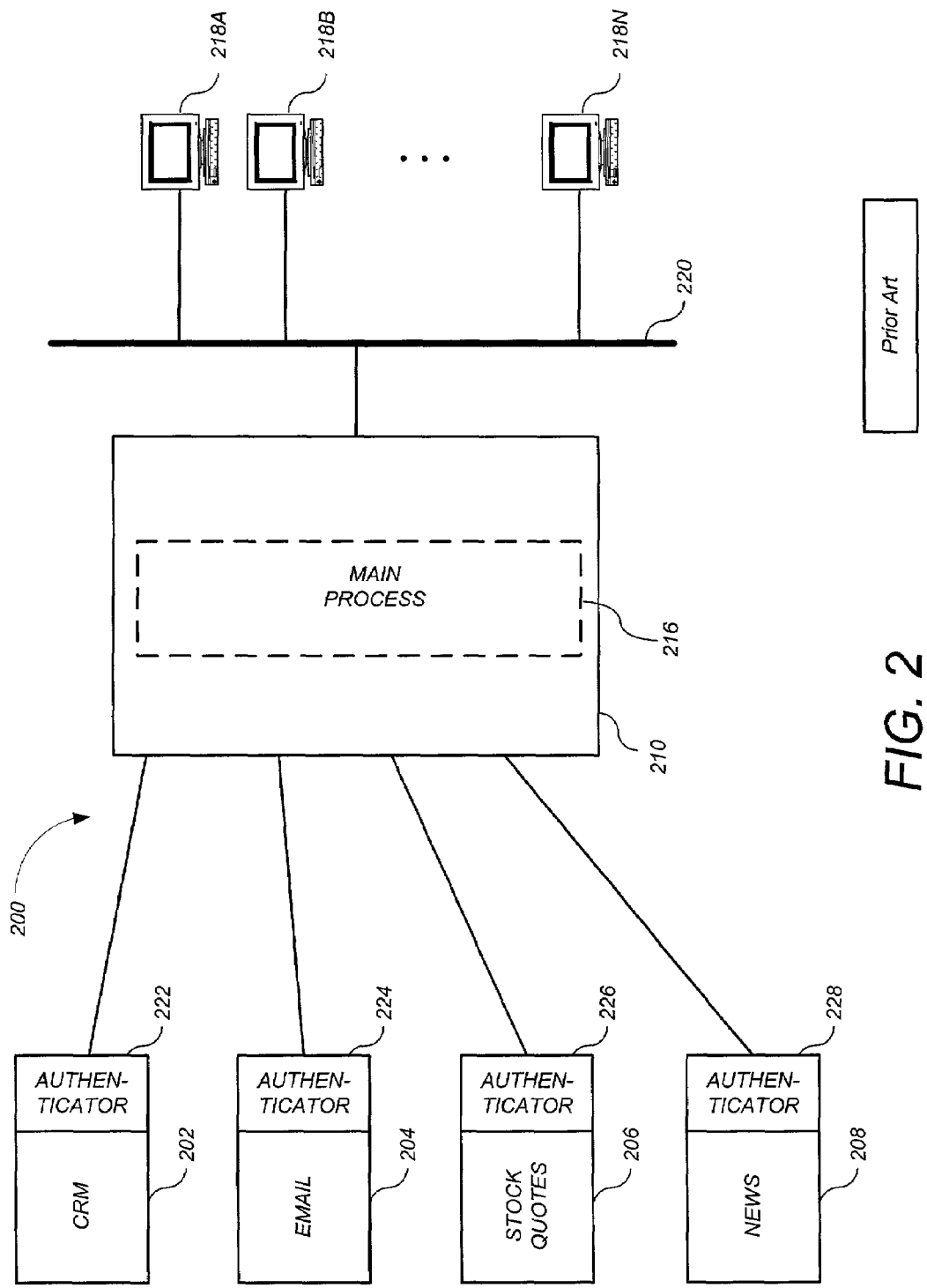
FIG. 2 shows a system for delivering personalized content according to a prior art method.
Figure 3:
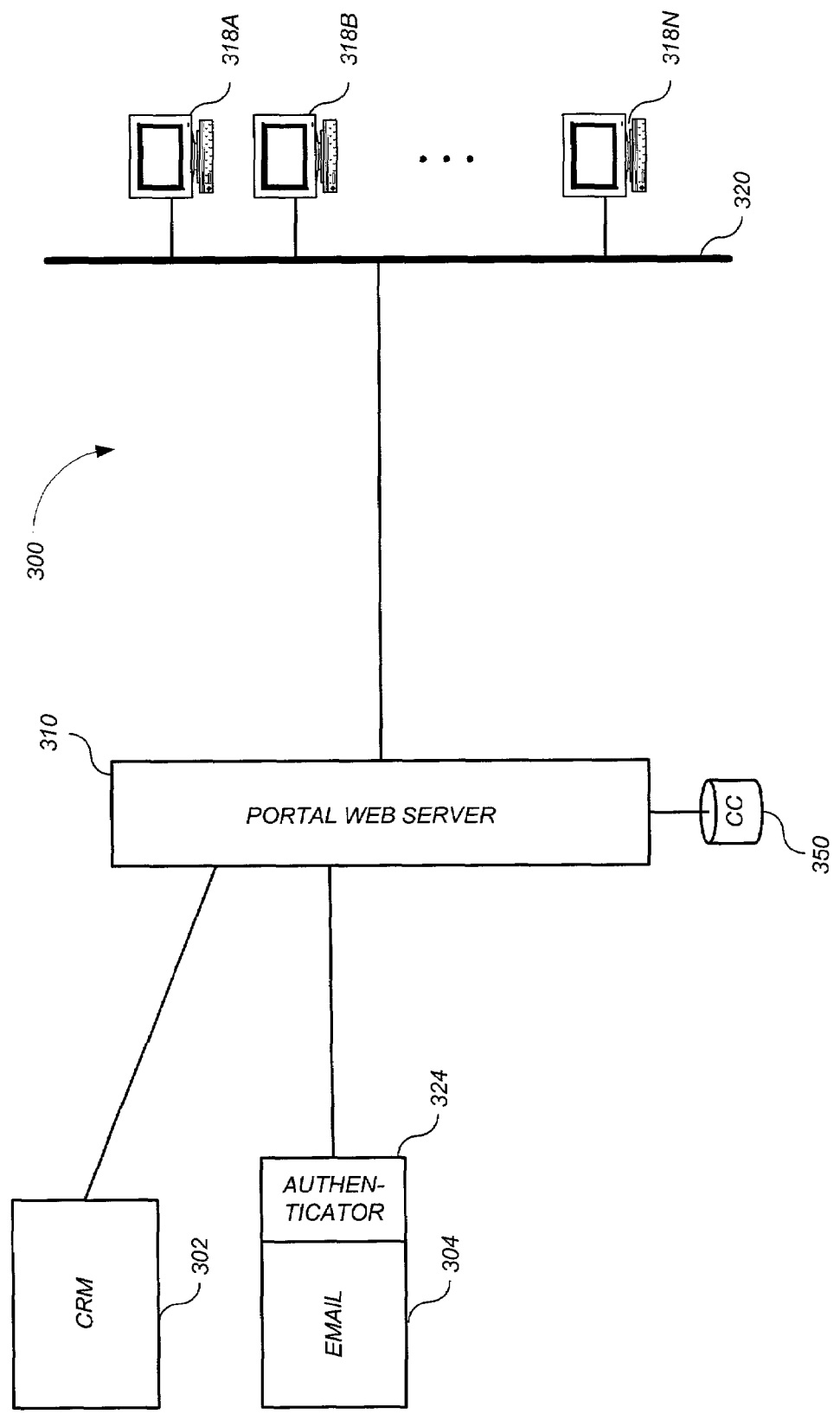
FIG. 3 shows a system for delivering personalized content according to one implementation.

FIG. 3 shows a system 300 for delivering personalized content according to one implementation. A plurality of resource servers 302 and 304 host resource components. Referring to FIG. 3, a CRM server 302 hosts resources such as customer lists and customer contact information. An email server 304 hosts resources such as email messages for a group of users. A Web server 310 maintains a list of the types of resources available from resource servers 302 and 304, and advertises these types of resources to users. Of course, other types of resources, such as enterprise resource planning resources, can be made available to users.

In one implementation, Web server 310 is a corporate portal. A fundamental purpose of a corporate portal is to allow users a single point of access to all the content, applications, and resources that they need to run their business on a daily basis. This experience is enhanced if users can access all of the resources they are authorized to use through a single act of authentication. Rather than logging on to the portal and then being repeatedly prompted for user name and password as they access various resources, users can move easily between resources, for example shifting with a single click from their email to a query of their CRM application.

Remote users employ user terminals 318A and 318B through 318N to access Web server 310 over a network 320 such as the Internet. A user of a user terminal 318 is referred to as "remote" from Web server 310 because he is not physically operating Web server 310, but rather is operating a user terminal 318 that is physically separate from Web server 310. As used herein, "user terminal" refers to any device that a user could employ to access the Web server including a computer running a Web browser, a personal digital assistant, a cellular phone, and the like.

Web server 310 communicates with each resource server 302 and 304 using a generic application-layer protocol such as HTTP. In one implementation, Web server 310 uses the same protocol for all of the resource servers. Any needed protocol translations are performed at the resource server.

The resource servers can include secure resource servers, such as 304, and open servers, such as CRM server 302. Some secure servers 304 employ a secure front end, referred to herein as an "authenticator," to limit access. To gain access to a secure server, a request must provide a security credential of the type required by the authenticator protecting that secure server. One type of security credential is the userid/password required by HTTP 1.1 basic authentication. When challenged by a web site using HTTP 1.1 basic authentication, a user provides his userid and password. If the userid/password matches the userid/password stored in an access control list maintained by the server, the user is granted access. The userid/password can be entered manually by the user, or can be passed to the server as a persistent cookie in the HTTP header of a request. After authenticating a user, a secure server may issue the user a session cookie, which the secure server will accept in subsequent requests to authenticate the user for the duration of the user's session with the secure server.

In one implementation, Web server 310 authenticates users according to HTTP 1.1 basic authentication. Web server 310 retains the logon/password for each user, for example in a credentials cache 350. Web server 3 10 examines each user request to determine which content components are required, and therefore which resource servers must be accessed to provide those content components.

Figure 4:
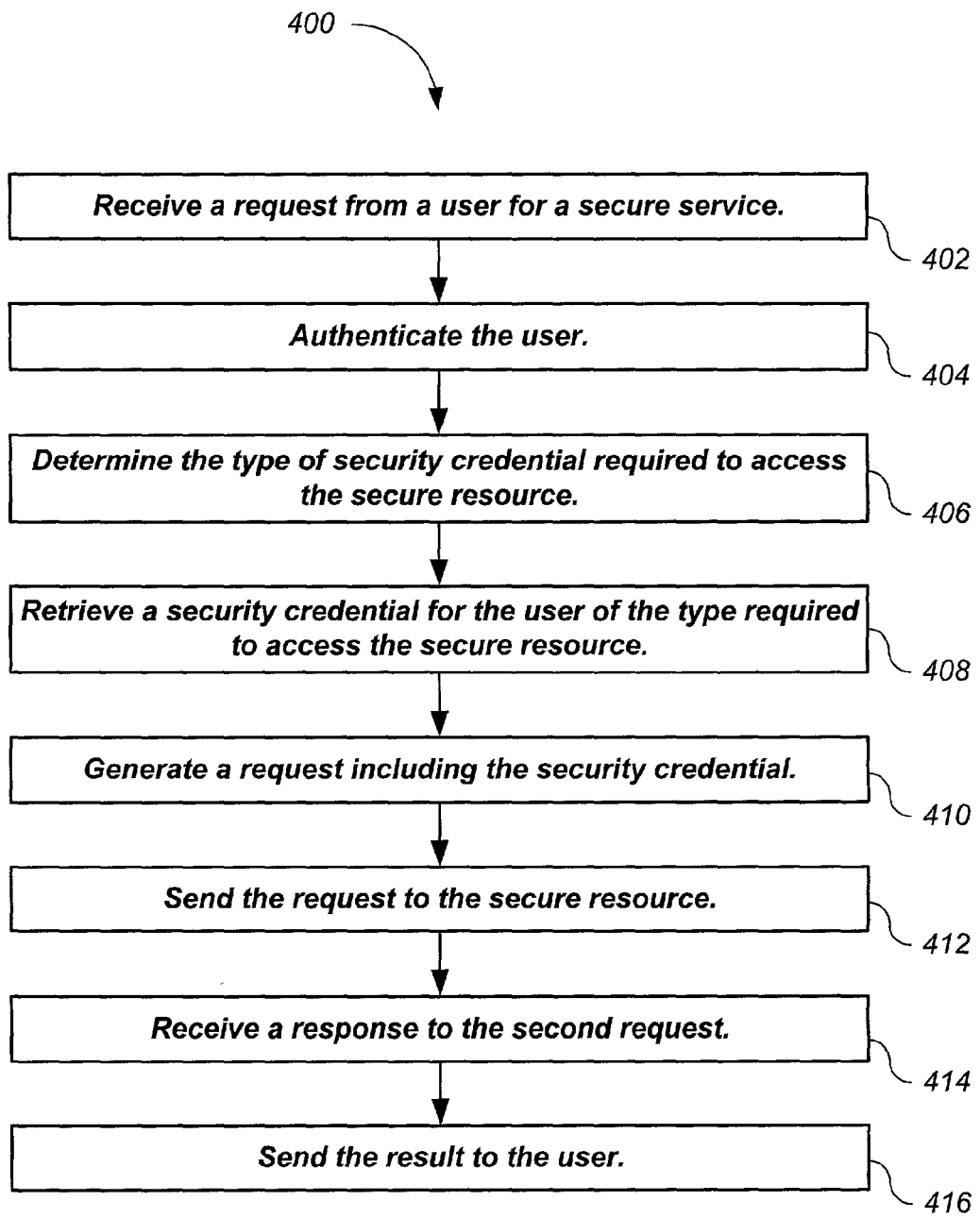
FIG. 4 shows a process executed by a Web server according to one implementation of the system of FIG. 3.

FIG. 4 shows a process 400 executed by Web server 310 according to one implementation of system 300. Process 400 begins when Web server 310 receives a request from a user for a secure resource (step 402). In one implementation, the request is part of a request for personalized content, such as a "my page," that the user has previously defined to contain one or more content components hosted by the secure resource. Web server 310 authenticates the user (step 404). In one implementation, Web server 310 obtains HTTP 1.1 basic authentication security credentials (userid/password) from the request. Web server 310 retains the userid/password for possible subsequent use.

In another implementation, Web server 310 asks the operating system executing on the user terminal 318 for the userid/password of the currently logged-in user, rather than prompting the user. If the user has already logged into her workstation, the operating system sends the login credentials to Web server 310 without user intervention.

When a user logs on to Web server 310, she can choose to have the Web server remember her userid/password so that she does not have to type them in the next time she accesses the Web server. When she logs on to the Web server successfully, the Web server stores her name and password as persistent cookies. These cookies are stored as part of her profile on her computer; whenever she logs on to her computer, the cookie that contains her name and password is made available to her Internet browser. The next time she logs on to her computer and brings up an Internet browser that connects to Web server 310, her browser sends the cookie with her userid/password to Web server 310, and she is granted access to Web server 310 without having to type in her userid/password.

Figure 5:
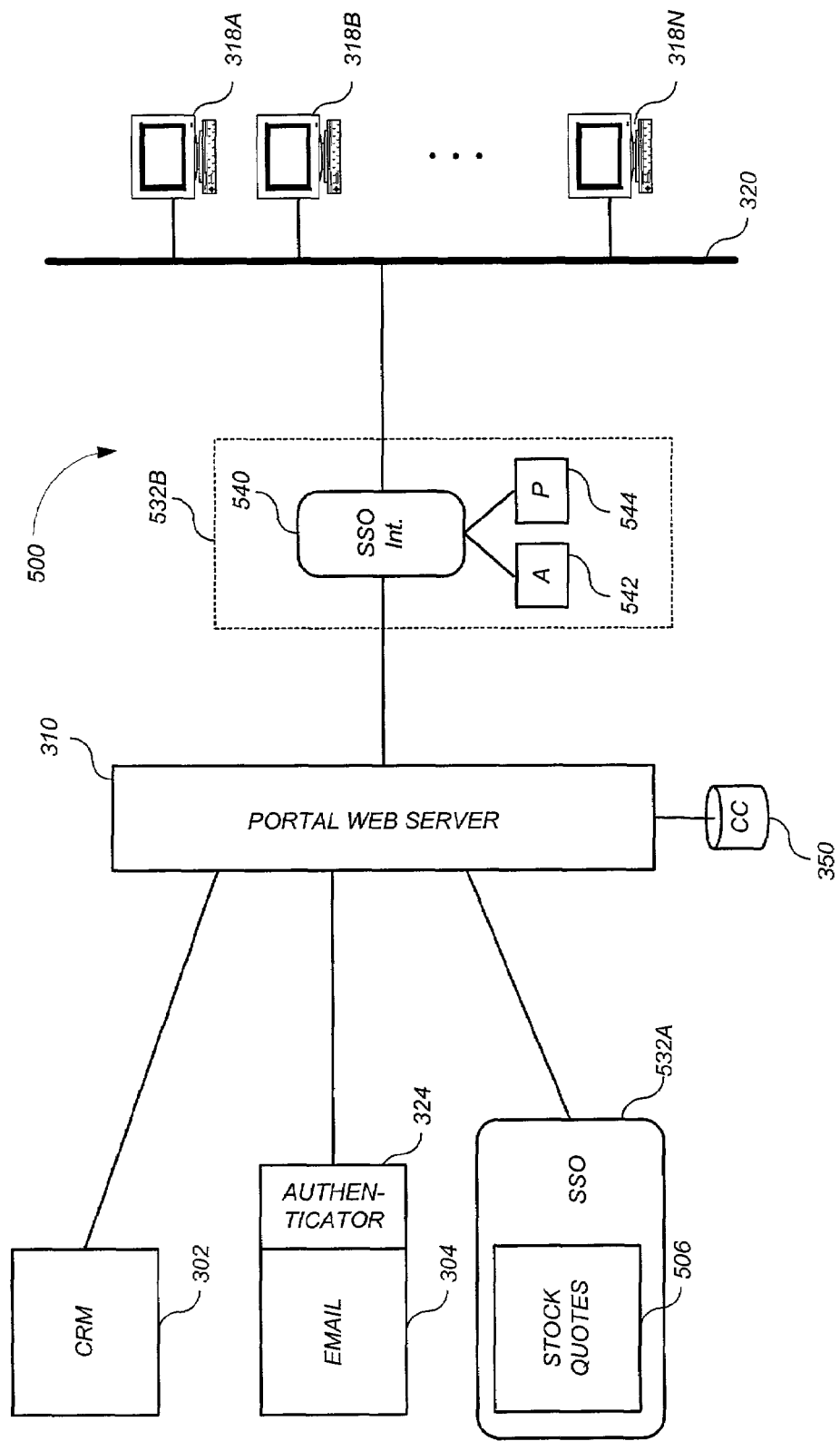
FIG. 5 shows a system according to an implementation that is integrated with an SSO product.

Based on the request, Web server 310 identifies the resources requested by the user. For each requested resource, Web server 310 determines the type of security credential required for access. Assume that the user request requires content from all of resource servers 302, 304, and 506. Referring to FIG. 5, Web server 310 determines that CRM server 302 requires no security credentials for access, that authenticator 324 requires HTTP 1.1 basic authentication security credentials to access email server 304, and that SSO product 532A requires an SSO token to access stock quotes server 506. This determination is made in a method similar to that described above with respect to FIG. 3.

Web server 310 maintains a map between each resource server and the type of security credential required to access that resource server, and employs this map to determine the type of security credential required by each server. In one implementation, this map is established by a system administrator when configuring Web server 310. However, this map can be established by other methods. The map can take various forms. For example, a simple true/false flag can be maintained for each resource server. When the flag is true for a resource serve, the userid/logon should be sent. As another example, the path and domain of each secure server requiring an SSO credential (discussed in more detail below) can be stored. Whenever a user request requires access to one of the secure servers, and the path/domain match one of the stored path/domain pairs, the SSO credential for that path/domain are sent. Finally, some secure servers may require custom credentials that neither conform to a standard such as HTTP 1.1, nor to a commercial SSO product. In this case, Web server 310 simply stores the required credentials, which are furnished to the secure server as needed.

In one implementation, Web server 310 stores security credentials for its users, for example in credentials cache 350, or in memory for a single session. Web server 310 can also obtain credentials from other sources, as is well-know in the relevant arts.

When a user's request requires access to a resource on a secure server, Web server 310 retrieves a security credential for the user of the type required to access the secure resource (step 408). Referring to FIG. 3, Web server 310 retrieves the userid/password for the user.

Web server 310 then generates a request for each resource required by the user's request. For requests directed to a secure server, Web server 310 generates a request including the retrieved security credential for the user of the type required by that server (step 410). Web server 310 then sends each request to the appropriate resource server. Because CRM server 302 requires no security credentials for access, a request having no security credentials is sent to CRM server 302, which returns a response including the requested content. Because authenticator 324 requires HTTP 1.1 basic authentication security credentials, a request including the user's userid/password is sent to email server 304 (step 412). In this way, Web server 310 ensures that each resource server receives only those security credentials (if any) required for access. These requests can be sent sequentially or concurrently as described in U.S. Ser. No. 09/949,532 filed Sep. 7, 2001, which is incorporated by reference herein.

After the request sent to email server 304 is authenticated by authenticator 324, email server 304 returns a response including the requested content. Web server 310 receives the responses (step 414), and assembles a result based on the responses. For example, Web server 310 assembles the personalized content requested by the user. Web server 310 sends the result to the user (step 416).

Some implementations can integrate with commercially-available single-sign-on products such as those made by Netegrity, Securant, Oblix and Entrust. These integrations allow a user to log on to the portal without being prompted for security credentials if she has already logged on to another resource protected by the same SSO product. Combined with a variety of login methods, SSO products support intricate authorization rules that permit granular control of what secured resources users can access.

Integration with SSO products has several benefits for administrators of the portal. Portal administrators to choose from various authentication methods—including passwords, biometrics, smart cards and others—that can be mixed and matched for specific objects, thereby providing administrators with highly granular control over access to different applications within the enterprise served by the portal. SSO solutions also offer a centralized way to manage user access and permissions to the portal, as well as other to enterprise applications and content, reducing administrative costs and development time.

In general, all resources secured by an SSO product trust the SSO product to request and process credentials from its users. Most SSO products attach to many kinds of user and group stores, such as LDAP (lightweight development access protocol), NT (new technology; Microsoft Windows™), or ODBC (Oracle™ or open database connectivity) databases. Administrators can choose to protect all or only a few of their Web servers with an SSO product. If the portal has users (such as business partners) who do not have accounts with the SSO product, these users must log in through a virtual directory that is not protected by SSO. However, if all of the portal users are SSO users, then the administrator can enable SSO on every portal server.

FIG. 5 shows a system 500 according to an implementation that is integrated with an SSO product. A plurality of resource servers 302, 304 and 306 host different types of content components. For example, a stock quotes server 506 hosts content such as stock quotes. Users employ user terminals 318A and 318B through 318N to access Web server 310 over a network 320 such as the Internet as described above. Web server 310 communicates with each resource server using a generic application-layer protocol such as HTTP. In one implementation, Web server 310 uses the same protocol for all of the resource servers. Any needed protocol translations are performed at the resource server.

The resource servers can include secure and open servers. Referring to FIG. 5, a pair of SSO products 532A and 532B protect secure stock quotes server 506 and Web server 310. Another SSO product 532B protects Web server 310. SSO products usually have at least three components: an interceptor 540, an authentication server 542, and a policy server 544. For simplicity, these components are shown only for SSO product 532B.

Figure 6A:
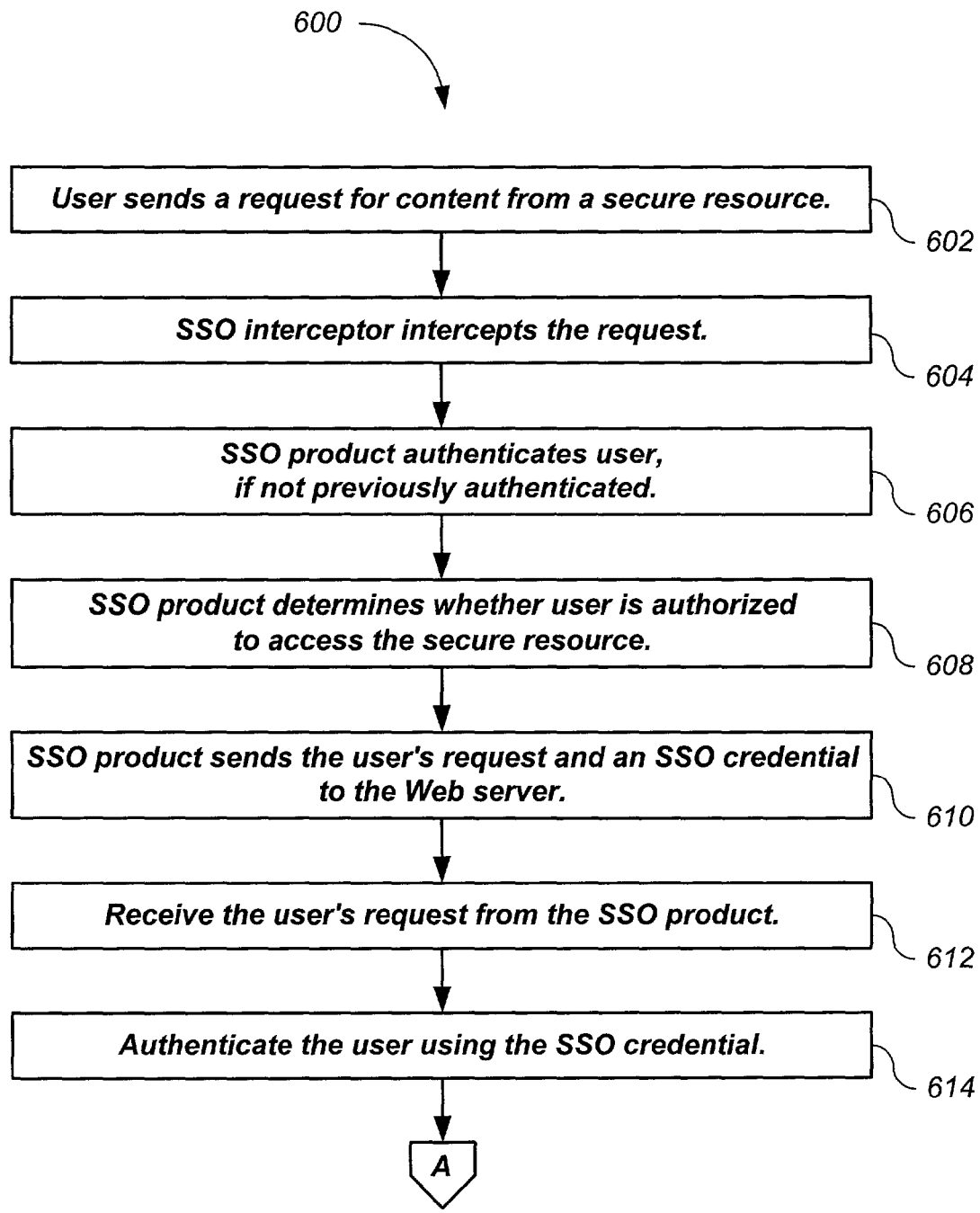
FIG. 6 shows a process executed by a Web server according to one implementation of the system of FIG. 5.
Figure 6B:
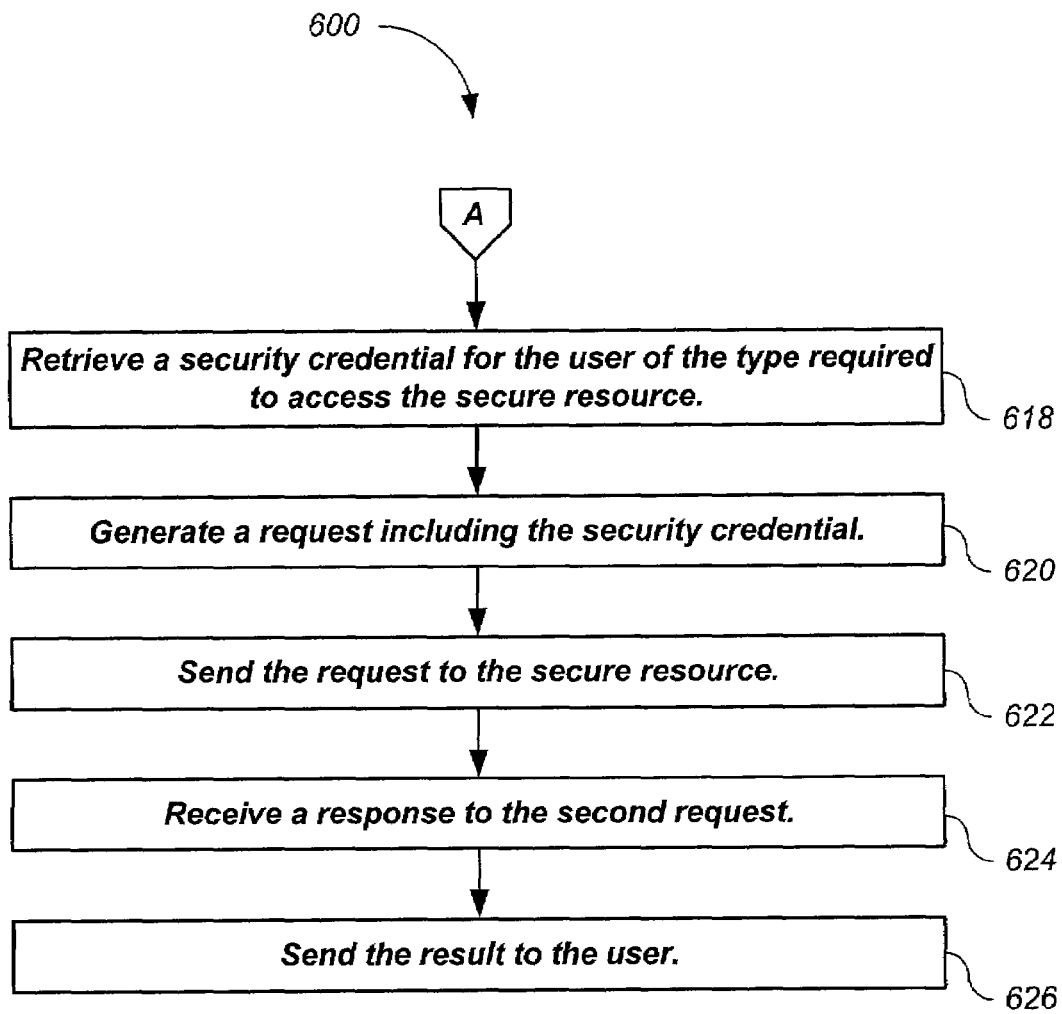

FIG. 6 shows a process 600 executed by Web server 310 according to one implementation of system 500. Process 600 begins when a user sends a request for content from a secure resource (step 602). An SSO interceptor 540 intercepts the request before it reaches Web server 310 (step 604). Interceptors are usually installed on each server that hosts a secured resource. This secured resource can be a Web page or Web service on a Web site. In a Windows environment, the interceptor can be an ISAPI filter that is installed on the Web site. An ISAPI filter alters each incoming HTTP request before passing it along to the protected Web site to ensure the user is authenticated and authorized. For corporate portal deployments in the UNIX environment, NSAPI or Apache Modules provide analogous functionality.

For instance, an interceptor might be installed on an enterprise's partner Web site, email server, and portal Web servers. Whenever a user attempts to access one of these systems, the interceptor intercepts the request. The interceptor checks whether the user has already been authenticated to at least one of the protected applications. The SSO product checks in a cache of currently logged-in users to see whether the user has logged in recently. If the user is found, then she is granted access to the secured resource without being asked to enter any additional credentials. If the user does not have a current logged-in session, she will be prompted for credentials.

SSO product 532B authenticates the user, if she hasn't been authenticated already, using an authentication server 542 (step 606). Once a user is authenticated, the SSO product determines whether she is authorized to access the resource being requested (in this case, Web server 310) using policy server 544 (step 608). The process of authorizing access to a secured resource is similar to processing the access control list of a document: some users can read the document, some can write the document, and some can't view the document at all. Most SSO products have a component called a policy server that stores this information about which users and groups can access which secured resources. Although an SSO product's policy server cannot protect portal-specific objects, such as cards that contain metadata, the policy server can protect secure resource servers accessed through the Web server 310.

Once the interceptor has both authenticated and authorized the user, the interceptor adds information to the user's HTTP request and sends the request to the Web site that the user is attempting to access (in this case, Web server 310). In one implementation, this extra information is in the form of HTTP headers, and includes an encrypted security token (referred to herein as an "SSO credential") as well as additional information about the user, such as her name (step 610). Most SSO products allow administrators to configure the information that is added to the HTTP request; for instance, many SSO products allow administrators to pull a user's attributes from an LDAP directory and send them in the HTTP request.

Web server 310 receives the user's request from SSO product 532B (step 612). In one implementation, the request is part of a request for personalized content, such as a "my page," that the user has previously defined to contain one or more content components that include the secure resource. Web server 310 authenticates the user using the SSO credential (step 614). In one implementation, the request also includes the HTTP 1.1 basic authentication security credentials (userid/password) for the user. Web server 310 retains the userid/password for possible subsequent use. Based on the request, Web server 310 identifies the resources requested by the user. For each requested resource, Web server 310 determines the type of security credential required for access (step 616). Assume that the user request requires content from all of resource servers 302, 304, and 506. Referring to FIG. 5, Web server 310 determines that CRM server 302 requires no security credentials for access, that authenticator 324 requires HTTP 1.1 basic authentication security credentials to access email server 304, and that SSO product 532A requires an SSO token to access stock quotes server 506. This determination is made in a method similar to that described above with respect to FIG. 3.

Web server 310 stores security credentials for its users, for example in credentials cache 350. When a user's request requires access to a resource on a secure server, Web server 310 retrieves a security credential for the user of the type required to access the secure resource (step 618). Referring to FIG. 5, Web server 310 retrieves the userid/password for the user and the SSO token received from SSO product 532B.

Web server 310 then generates a request for each resource required by the user's request. For requests directed to a secure server, Web server 310 generates a request including the retrieved security credential for the user of the type required by that server (step 620). Web server 310 then sends each request to the appropriate resource server. A request having no security credentials is sent to CRM server 302, which returns a response including the requested content. A request including the proper security credentials is sent to each required secure server (step 622). A request including the user's userid/password is sent to email server 304. A request including the SSO token is sent to stock quotes server 506. In this manner, Web server 310 ensures that each resource server receives only those security credentials (if any) required for access.

Each secure resource server authenticates the request using the supplied security credentials. Each resource server then returns a response including the requested content. Web server 310 receives the responses (step 624), and assembles a result based on the responses. For example, Web server 310 assembles the personalized content requested by the user. Web server 310 sends the result to the user (step 626).

Figure 7:
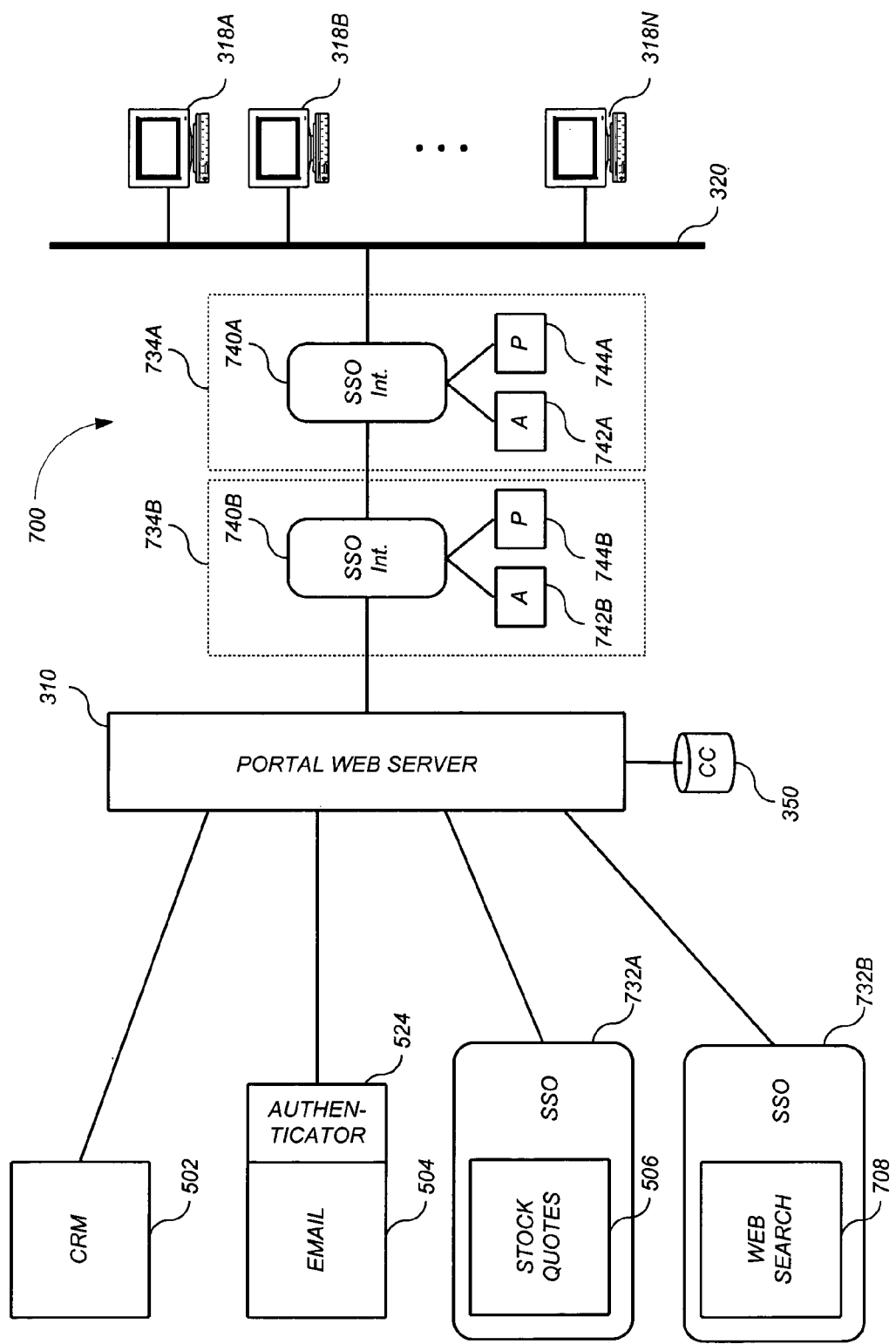
FIG. 7 shows a system according to an implementation that is integrated with a plurality of SSO products simultaneously.

Some implementations can integrate with a plurality of SSO products simultaneously. FIG. 7 shows a system 700 according to such an implementation. A plurality of resource servers 302, 304 and 506 host different types of content components, as described above. In addition, a web search server 708 provides services such as web search capabilities. Users employ user terminals 318A and 318B through 318N to access Web server 310 over a network 320 such as the Internet, as described above. Web server 310 communicates with each resource server using a generic application-layer protocol such as HTTP. In one implementation, Web server 310 uses the same protocol for all of the resource servers. Any needed protocol translations are performed at the resource server.

The resource servers can include secure and open servers. Referring to FIG. 7, a pair of SSO products 732A and 732B protect secure stock quotes server 506 and secure web search server 708. SSO products 734A and 734B respectively include interceptors 740A and 740B, authentication servers 742A and 742B, and a policy servers 744A and 744B. Note that SSO products 732A and 732B are different SSO products, for example manufactured by different SSO vendors.

Figure 8A:
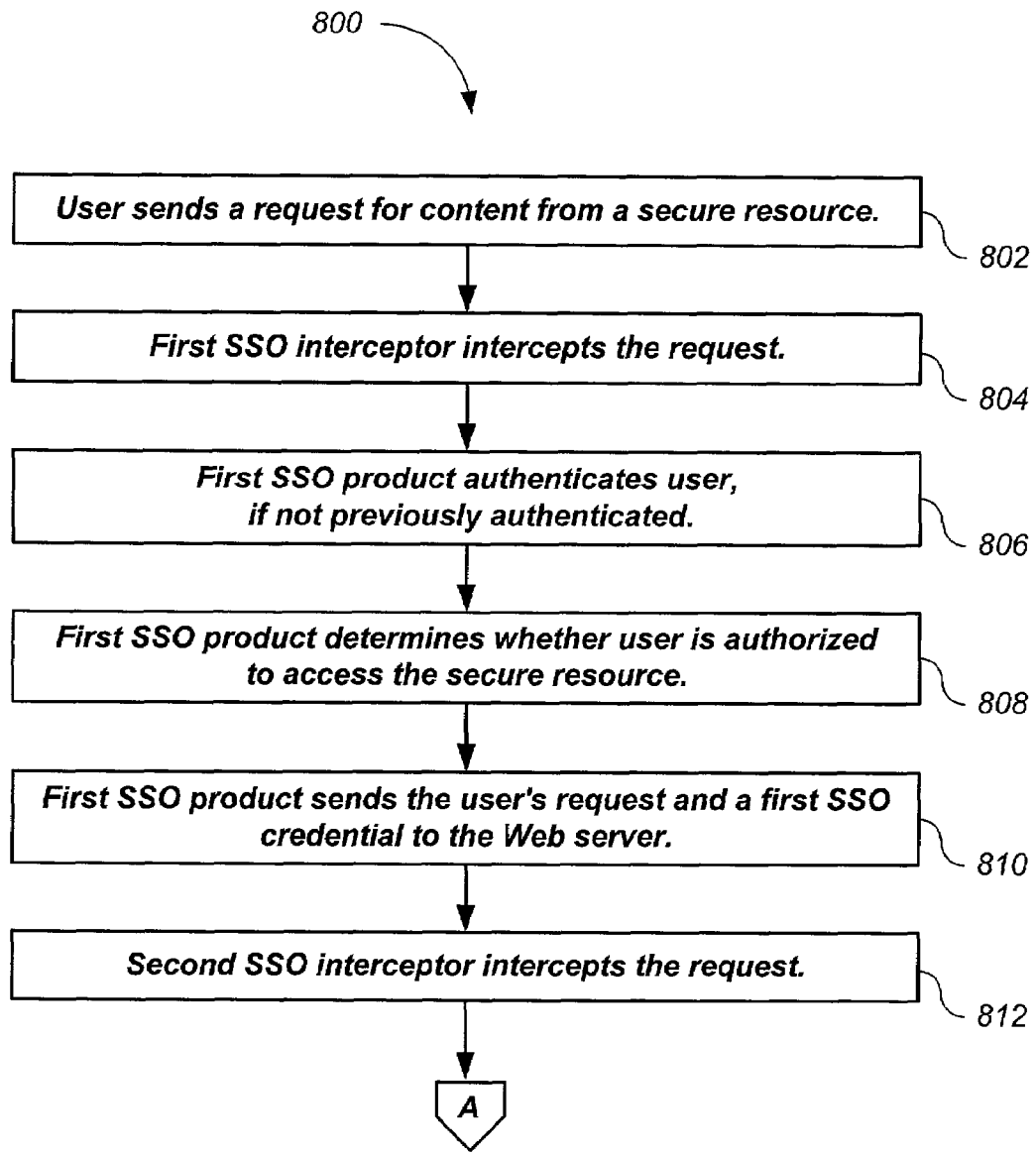
FIG. 8 shows a process executed by a Web server according to one implementation of the system of FIG. 7.
Figure 8B:
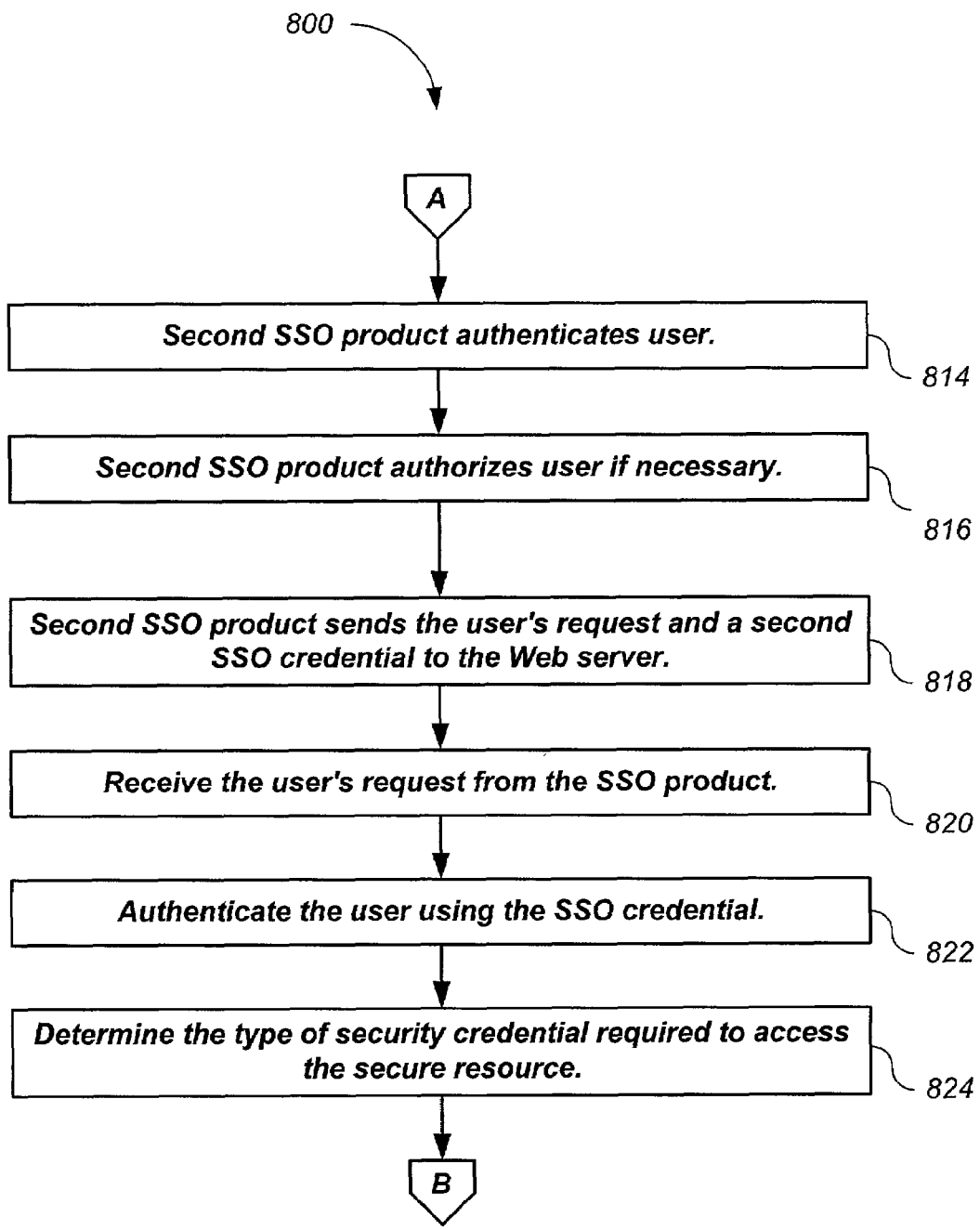
Figure 8C:
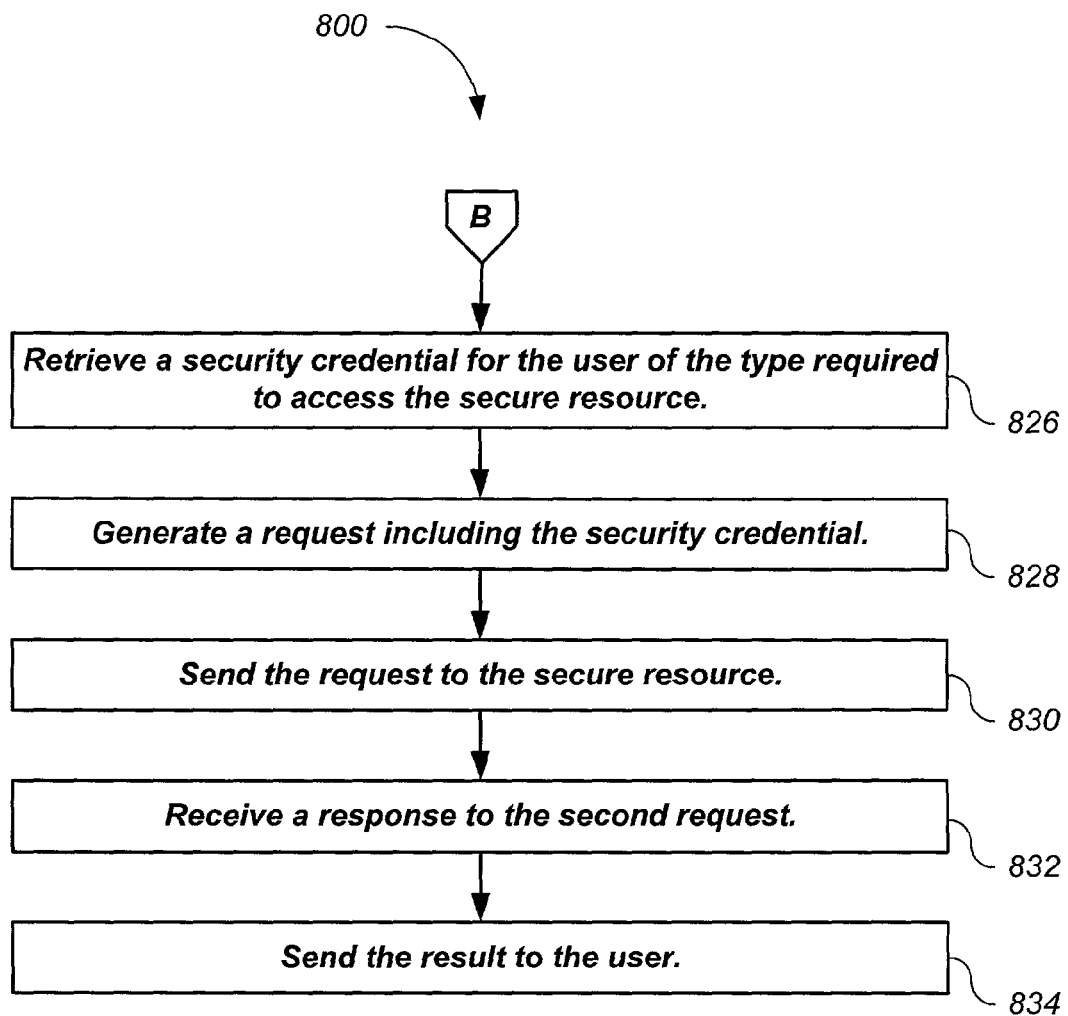

FIG. 8 shows a process 800 executed by Web server 310 according to one implementation of system 700. Process 800 begins when a user sends a request for content hosted by a secure resource (step 802). The first SSO interceptor 740A intercepts the request before it reaches Web server 310 (step 804). SSO product 732B authenticates the user, if she hasn't been authenticated already, using authentication server 742A (step 806). Once a user is authenticated, the SSO product determines whether she is authorized to access the resource being requested (in this case, Web server 310) using policy server 744A (step 808).

Once the interceptor has both authenticated and authorized the user, the interceptor adds information to the user's HTTP request and sends the request to the Web site that the user is attempting to access (in this case, Web server 310). In one implementation, this extra information is in the form of HTTP headers, and includes an encrypted security token (referred to herein as an "SSO credential") as well as additional information about the user, such as her name (step 810).

The second SSO interceptor 740B intercepts the request before it reaches Web server 310 (step 812) and authenticates the user (step 814). If SSO product 734 has been configured to trust SSO product 732, then SSO product 734B can authenticate the user based on the SSO credential included in the request by SSO product 732B. If not, then SSO product 734B can authenticate the user based on the user's login credentials, or a session cookie based on those credentials. If necessary, SSO product 734B can authorize the user as well (step 816).

Once interceptor 704B has authenticated the user, interceptor 704B adds a SSO credential to the user's HTTP request in a manner similar to that described above, and sends the request to Web server 310 (step 818).

Web server 310 receives the user's request from SSO product 734B (step 820). In one implementation, the request is part of a request for personalized content, such as a "my page," that the user has previously defined to contain one or more content components that include the secure resource. Web server 310 authenticates the user using the SSO credential generated by SSO product 732B (step 822). In one implementation, the request also includes the HTTP 1.1 basic authentication security credentials (userid/password) for the user. Web server 310 retains the userid/password for possible subsequent use.

Based on the request, Web server 310 identifies the resources requested by the user. For each requested resource, Web server 310 determines the type of security credential required for access (step 824). Assume that the user request requires content from all of resource servers 302, 304, 506 and 708. Referring to FIG. 7, Web server 310 determines that CRM server 302 requires no security credentials for access, that authenticator 324 requires HTTP 1.1 basic authentication security credentials to access email server 304, and that SSO products 732A and 734A each require a SSO token. This determination is made in a method similar to that described above with respect to FIG. 5.

Web server 310 stores security credentials for its users, for example in credentials cache 350. When a user's request requires access to a resource on a secure server, Web server 310 retrieves a security credential for the user of the type required to access the secure resource (step 826). Referring to FIG. 7, Web server 310 retrieves the userid/password for the user and the SSO tokens received from SSO products 732B and 734B.

Web server 310 then generates a request for each resource required by the user's request. For requests directed to a secure server, Web server 310 generates a request including the retrieved security credential for the user of the type required by that server (step 828). Web server 310 then sends each request to the appropriate resource server. A request having no security credentials is sent to CRM server 302, which returns a response including the requested content. A request including the proper security credentials is sent to each required secure server (step 830). A request including the user's userid/password is sent to email server 304. A request including the SSO token generated by SSO product 732B is sent to stock quotes server 506. A request including the SSO token generated by SSO product 734B is sent to Web search server 708. In this manner, Web server 310 ensures that each resource server receives only those security credentials (if any) required for access.

Each secure resource server authenticates the request using the supplied security credentials. Each resource server then returns a response including the requested content. Web server 310 receives the responses (step 832), and assembles a result based on the responses. For example, Web server 310 assembles the personalized content requested by the user. Web server 310 sends the result to the user (step 834).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto- optical disks; and optical disks. Storage devices suitable for tangibly embodying computer program instructions and data include all forms of non-volatile memory, including by way of example semiconductor memory devices, such as EPROM (erasable Programmable read-only memory), EEPROM (electrically erasable Programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention.

For example, various trust relationships can be established between SSO products such that one type of SSO product will accept tokens generated by another type of SSO product, as is well-known in the relevant art. In such cases, it is not necessary to add every type of token to each user request. For example, if SSO product A is configured to accept the tokens of SSO product B, then it is not necessary to provide an interceptor for SSO product A. Accordingly, other embodiments are within the scope of the following claims.

What is claimed is:

1. A computer-implemented method for use in a network environment including an enterprise server, comprising:

storing at the enterprise server multiple security credentials for a remote user to access respective secure resources residing on a network employing a generic application layer network protocol;

maintaining a map between a plurality of resource servers and a type of security credential required to access each resource server, including maintaining a true/false flag and storing a path/domain for each of the plurality of resource servers;

receiving at the enterprise server a signal representing a request from the remote user for a first of the secure resources, wherein the request includes a logon credential for the remote user;

determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;

sending from the enterprise server a signal representing a second request to retrieve the first secure resource, the second request including a first of the security credentials for the user of the type required to access the first secure resource;

receiving at the enterprise server a signal representing a first single-sign-on (SSO) credential generated by a first SSO provider based on the logon credential;

sending from the enterprise server a signal representing the first SSO credential to retrieve the first secure resource when the type of credential required to access the first secure resource includes the first SSO credential; and sending from the enterprise server a signal representing the first SSO credential to retrieve the first secure resource when the type of credential required to access the first secure resource includes a second SSO credential corresponding to a second SSO provider having a trust relationship with the first SSO provider.

2. The method of claim 1, further comprising:
authenticating the user before sending the signal representing the second request.

3. The method of claim 1, further comprising:
receiving at the enterprise server a signal representing a response to the second request; and
sending from the enterprise server a signal representing a result to the remote user, the result based on the response to the second request.

4. The method of claim 1, wherein the request includes a logon credential for the remote user, the method further comprising: authenticating the remote user based on the logon credential before sending the second request.

5. The method of claim 1, wherein the request includes a logon credential for the remote user and the type of security credential required to access the first secure resource includes the logon credential, the method further comprising:
sending the signal representing the second request to retrieve the first secure resource, the second request including the logon credential.

6. The method of claim 1, wherein the generic application-layer network protocol is hypertext transfer protocol.

7. The method of claim 6, further comprising:
receiving at the enterprise server a signal representing data in response to the second request; and
sending from the enterprise server a signal representing at least a portion of the data to the remote user.

8. The method of claim 7, wherein the first secure resource includes a Web site, and the data is hypertext mark-up language.

9. A computer-implemented method for use in a network environment including an enterprise server, comprising:

storing at the enterprise server multiple security credentials for a remote user to access respective secure resources residing on a network employing a generic application layer network protocol;

maintaining a map between a plurality of resource servers and a type of security credential required to access each resource server, including maintaining a true/false flag and storing a path/domain for each of the plurality of resource servers;

receiving at the enterprise server a signal representing a request from the remote user for a first of the secure resources, wherein the request includes a logon credential for the remote user;

determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;

sending from the enterprise server a signal representing a second request to retrieve the first secure resource, the second request including a first of the security credentials for the user of the type required to access the first secure resource;

receiving at the enterprise server a signal representing a first single-sign-on (SSO) credential generated by a first SSO provider based on the logon credential;

sending from the enterprise server a signal representing the first SSO credential to retrieve the first secure resource when the type of credential required to access the first secure resource includes the first SSO credential;

receiving at the enterprise server a signal representing a second SSO credential generated by a second SSO provider based on the first SSO credential; and sending from the enterprise server a signal representing the second SSO credential to retrieve the first secure resource when the type of credential required to access the first secure resource includes the second SSO credential.

10. The method of claim 9, further comprising:
authenticating the user before sending the signal representing the second request.

11. The method of claim 9, further comprising:
receiving at the enterprise server a signal representing a response to the second request; and
sending from the enterprise server a signal representing a result to the remote user, the result based on the response to the second request.

12. The method of claim 9, wherein the request includes a logon credential for the remote user, the method further comprising: authenticating the remote user based on the logon credential before sending the second request.

13. The method of claim 9, wherein the request includes a logon credential for the remote user and the type of security credential required to access the first secure resource includes the logon credential, the method further comprising:
sending the signal representing the second request to retrieve the first secure resource, the second request including the logon credential.

14. The method of claim 9, wherein the generic application-layer network protocol is hypertext transfer protocol.

15. The method of claim 14, further comprising:
receiving at the enterprise server a signal representing data in response to the second request; and sending from the enterprise server a signal representing at least a portion of the data to the remote user.

16. The method of claim 15, wherein the first secure resource includes a Web site, and the data is hypertext markup language.

17. A computer-implemented method for use in a network environment including an enterprise server, comprising:
storing at the enterprise server multiple security credentials for a remote user to access respective secure resources residing on a network employing a generic application layer network protocol;
maintaining a map between a plurality of resource servers and a type of security credential required to access each resource server, including maintaining a true/false flag and storing a path/domain for each of the plurality of resource servers;
receiving at the enterprise server a signal representing a request from the remote user for a first of the secure resources, wherein the request includes a logon credential for the remote user;
determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;
sending from the enterprise server a signal representing a second request to retrieve the first secure resource, the second request including a first of the security credentials for the user of the type required to access the first secure resource, wherein the receiving includes receiving at the enterprise server a signal representing a third request from the remote user for a second of the secure resources residing on the network,
determining, without the intervention of the user, the type of security credential for the remote user that is required to access the second secure resource; and sending from the enterprise server a signal representing a fourth request for retrieving the second secure resource, the fourth request including a second of the security credentials for the user of the type required to access the second secure resource; and wherein the signals representing the second and fourth requests are sent concurrently.

18. The method of claim 17, wherein the types of security credentials included in the second and fourth requests differ.

19. The method of claim 17, wherein the types of security credentials included in the second and fourth requests are the same.

20. The method of claim 17, wherein the generic application-layer network protocol is hypertext transfer protocol.

21. The method of claim 20, further comprising:
receiving at the enterprise server a signal representing data in response to the second request; and
sending from the enterprise server a signal representing at least a portion of the data to the remote user.

22. The method of claim 21, wherein the first secure resource includes a Web site, and the data is hypertext markup language.

23. An apparatus for use in a network environment including an enterprise server, comprising:
means for storing at the enterprise server multiple security credentials for a remote user to access respective secure resources residing on a network employing a generic application layer network protocol;
means for maintaining a map between a plurality of resource servers and a type of security credential required to access each resource server, including maintaining a true/false flag and storing a path/domain for each of the plurality of resource servers;
means for receiving at the enterprise server a signal representing a request from the remote user for a first of the secure resources;
means for determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;
means for sending from the enterprise server a signal representing a second request to retrieve the first secure resource, the second request including a first of the security credentials for the user of the type required to access the first secure resource, wherein the request includes a logon credential for the remote user;
means for receiving at the enterprise server a signal representing a first single-sign-on (SSO) credential generated by a first SSO provider based on the logon credential;
means for sending from the enterprise server a signal representing the first SSO credential to retrieve the first secure resource when the type of credential required to access the first secure resource includes the first SSO credential; and
means for sending from the enterprise server a signal representing the first SSO credential to retrieve the first secure resource when the type of credential required to access the first secure resource includes a second SSO credential corresponding to a second SSO provider having a trust relationship with a first SSO provider.

24. The apparatus of claim 23, further comprising:
means for authenticating the user before sending the signal representing the second request.

25. The apparatus of claim 23, further comprising:
means for receiving at the enterprise server a signal representing a response to the second request; and
means for sending from the enterprise server a signal representing a result to the remote user, the result based on the response to the second request.

26. The apparatus of claim 23, wherein the request includes a logon credential for the remote user, the apparatus further comprising:
means for authenticating the remote user based on the logon credential before sending the second request.

27. The apparatus of claim 23, wherein the request includes a logon credential for the remote user and the type of security credential required to access the first secure resource includes the logon credential, the apparatus further comprising:
means for sending from the enterprise server the signal representing the second request to retrieve the first secure resource, the second request including the logon credential.

28. The apparatus of claim 23, wherein the generic application-layer network protocol is hypertext transfer protocol.

29. The apparatus of claim 28, further comprising:
means for receiving at the enterprise server a signal representing data in response to the second request; and
means for sending from the enterprise server a signal representing at least a portion of the data to the remote user.

30. The apparatus of claim 29, wherein the first secure resource includes a Web site, and the data is hypertext markup language.

31. The apparatus of claim 23, wherein the means for receiving includes means for receiving at the enterprise server a signal representing a third request from the remote user for a second secure resource residing on the network, the apparatus further comprising:
means for determining, without the intervention of the user, the type of security credential for the remote user that is required to access the second secure resource; and
means for sending from the enterprise server a signal representing a fourth request to retrieve the second secure resource, the fourth request including a second of the security credentials for the user of the type required to access the second secure resource; and
wherein the signals representing the second and fourth requests are sent concurrently.

32. The apparatus of claim 31, wherein the types of security credentials included in the second and fourth requests differ.

33. The apparatus of claim 31, wherein the types of security credentials included in the second and fourth requests are the same.

34. The apparatus of claim 23, further comprising:
means for receiving at the enterprise server a signal representing the first security credential from the user before receiving the signal representing the first request.

35. The method of claim 23, wherein the generic application-layer network protocol is hypertext transfer protocol.

36. The method of claim 35, further comprising:
receiving at the enterprise server a signal representing data in response to the second request; and
sending from the enterprise server a signal representing at least a portion of the data to the remote user.

37. The method of claim 36, wherein the first secure resource includes a Web site, and the data is hypertext markup language.

38. An apparatus for use in a network environment including an enterprise server, comprising:
means for storing at the enterprise server multiple security credentials for a remote user to access respective secure resources residing on a network employing a generic application layer network protocol;
means for maintaining a map between a plurality of resource servers and a type of security credential required to access each resource server, including maintaining a true/false flag and storing a path/domain for each of the plurality of resource servers;
means for receiving at the enterprise server a signal representing a request from the remote user for a first of the secure resources;
means for determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;
means for receiving at the enterprise server a signal representing a first single-sign-on (SSO) credential generated by a first SSO provider based on the logon credential;
means for sending from the enterprise server a signal representing the first SSO credential to retrieve the first secure resource when the type of credential required to access the first secure resource includes the first SSO credential;
means for sending from the enterprise server a signal representing a second request to retrieve the first secure resource, the second request including a first of the security credentials for the user of the type required to access the first secure resource, wherein the request includes a logon credential for the remote user;
means for receiving at the enterprise server a signal representing a second SSO credential generated by a second SSO provider based on a the first SSO credential; and
means for sending from the enterprise server a signal representing the second SSO credential to the secure resource when the type of credential required to access the secure resource includes the second SSO credential.

39. The apparatus of claim 38, wherein the generic application-layer network protocol is hypertext transfer protocol.

40. The apparatus of claim 39, further comprising:
means for receiving at the enterprise server a signal representing data in response to the second request; and
means for sending from the enterprise server a signal representing at least a portion of the data to the remote user.

41. The apparatus of claim 40, wherein the first secure resource includes a Web site, and the data is hypertext markup language.

42. The apparatus of claim 38, wherein the means for receiving includes means for receiving at the enterprise server a signal representing a third request from the remote user for a second secure resource residing on the network, the apparatus further comprising:
means for determining, without the intervention of the user, the type of security credential for the remote user that is required to access the second secure resource; and
means for sending from the enterprise server a signal representing a fourth request to retrieve the second secure resource, the fourth request including a second of the security credentials for the user of the type required to access the second secure resource; and
wherein the signals representing the second and fourth requests are sent concurrently.

43. The apparatus of claim 42, wherein the types of security credentials included in the second and fourth requests differ.

44. The apparatus of claim 42, wherein the types of security credentials included in the second and fourth requests are the same.

45. The apparatus of claim 38, further comprising:
means for receiving at the enterprise server a signal representing the first security credential from the user before receiving the signal representing the first request.

46. One or more computer-readable media tangibly embodying a program of instructions executable by a computer to perform a method for use in a network environment including an enterprise server, the method comprising:
storing at the enterprise server multiple security credentials for a remote user to access respective secure resources residing on a network employing a generic application layer network protocol;
maintaining a map between a plurality of resource servers and a type of security credential required to access each resource server, including maintaining a true/false flag and storing a path/domain for each of the plurality of resource servers;
receiving at the enterprise server a signal representing a request from the remote user for a first of the secure resources, wherein the request includes a logon credential for the remote user;

determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;

sending from the enterprise server a signal representing a second request to retrieve the first secure resource, the second request including a first of the security credentials for the user of the type required to access the first secure resource;

receiving at the enterprise server a signal representing a first single-sign-on (SSO) credential generated by a first SSO provider based on the logon credential;

sending from the enterprise server a signal representing the first SSO credential to retrieve the first secure resource when the type of credential required to access the first secure resource includes the first SSO credential; and sending from the enterprise server a signal representing the first SSO credential to retrieve the first secure resource when the type of credential required to access the first secure resource includes a second SSO credential corresponding to a second SSO provider having a trust relationship with a first SSO provider.

47. The media of claim 33, wherein the method further comprises: authenticating the user before sending the signal representing the second request.

48. The media of claim 46, wherein the method further comprises:
receiving at the enterprise server a signal representing a response to the second request; and
sending from the enterprise server a signal representing a result to the remote user, the result based on the response to the second request.

49. The media of claim 46, wherein the request includes a logon credential for the remote user, wherein the method further comprises:
authenticating the remote user based on the logon credential before sending the second request.

50. The media of claim 46, wherein the request includes a logon credential for the remote user and the type of security credential required to access the first secure resource includes the logon credential, wherein the method further comprises:
sending from the enterprise server the signal representing the second request to retrieve the first secure resource, the second request including the logon credential.

51. The media of claim 46, wherein the generic application-layer network protocol is hypertext transfer protocol.

52. The media of claim 51, wherein the method further comprises:
receiving at the enterprise server a signal representing data in response to the second request; and
sending from the enterprise server a signal representing at least a portion of the data to the remote user.

53. The media of claim 52, wherein the first secure resource includes a Web site, and the data is hypertext mark-up language.

54. One or more computer-readable media tangibly embodying a program of instructions executable by a computer to perform a method for use in a network environment including an enterprise server, the method comprising:

storing at the enterprise server multiple security credentials for a remote user to access respective secure resources residing on a network employing a generic application layer network protocol;

maintaining a map between a plurality of resource servers and a type of security credential required to access each resource server, including maintaining a true/false flag and storing a path/domain for each of the plurality of resource servers;

receiving at the enterprise server a signal representing a request from the remote user for a first of the secure resources, wherein the request includes a logon credential for the remote user;

determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;

sending from the enterprise server a signal representing a second request to retrieve the first secure resource, the second request including a first of the security credentials for the user of the type required to access the first secure resource;

receiving at the enterprise server a signal representing a first single-sign- on (SSO) credential generated by a SSO provider based on the logon credential;

sending from the enterprise server a signal representing the first SSO credential to retrieve the first secure resource when the type of credential required to access the first secure resource includes the first SSO credential;

receiving at the enterprise server a signal representing a second SSO credential generated by a second SSO provider based on the first SSO credential; and sending from the enterprise server a signal representing the second SSO credential to retrieve the first secure resource when the type of credential required to access the first secure resource includes the second SSO credential.

55. The media of claim 54, wherein the method further comprises:
authenticating the user before sending the signal representing the second request.

56. The media of claim 54, wherein the method further comprises:
receiving at the enterprise server a signal representing a response to the second request; and
sending from the enterprise server a signal representing a result to the remote user, the result based on the response to the second request.

57. The media of claim 54, wherein the request includes a logon credential for the remote user, wherein the method further comprises:
authenticating the remote user based on the logon credential before sending the second request.

58. The media of claim 54, wherein the request includes a logon credential for the remote user and the type of security credential required to access the first secure resource includes the logon credential, wherein the method further comprises:
sending from the enterprise server the signal representing the second request to retrieve the first secure resource, the second request including the logon credential.

59. The media of claim 54, wherein the generic application-layer network protocol is hypertext transfer protocol.

60. The media of claim 59, wherein the method further comprises:
  receiving at the enterprise server a signal representing data in response to the second request; and
  sending from the enterprise server a signal representing at least a portion of the data to the remote user.

61. The media of claim 60, wherein the first secure resource includes a Web site, and the data is hypertext mark-up language.

62. One or more computer-readable media tangibly embodying a program of instructions executable by a computer to perform a method for use in a network environment including an enterprise server, the method comprising:
  storing at the enterprise server multiple security credentials for a remote user to access respective secure resources residing on a network employing a generic application layer network protocol;
  maintaining a map between a plurality of resource servers and a type of security credential required to access each resource server, including maintaining a true/false flag and storing a path/domain for each of the plurality of resource servers;
  receiving at the enterprise server a signal representing a request from the remote user for a first of the secure resources, wherein the request includes a logon credential for the remote user;
  determining, by referring to the map and without the intervention of the user, that the type of security credential for the remote user that is required to access the first secure resource comprises a first of the security credentials corresponding to a first path/domain for a first of the resource servers for which the map indicates a true flag, and wherein the determining includes matching the first path/domain with a stored path/domain corresponding to said first of the resource servers;
  sending from the enterprise server a signal representing a second request to retrieve the first secure resource, the second request including a first of the security credentials for the user of the type required to access the first secure resource, wherein the receiving includes receiving at the enterprise server a signal representing a third request from the remote user for a second secure resource residing on the network,
  determining, without the intervention of the user, the type of security credential for the remote user that is required to access the second secure resource; and
  sending from the enterprise server a signal representing a fourth request for retrieving the second secure resource, the fourth request including a second security credential for the user of the type required to access the second secure resource; and
  wherein the signals representing the second and fourth requests are sent concurrently.

63. The media of claim 62, wherein the types of security credentials included in the second and fourth requests differ.

64. The media of claim 62, wherein the types of security credentials included in the second and fourth requests are the same.

65. The media of claim 62, wherein the generic application-layer network protocol is hypertext transfer protocol.

66. The media of claim 65, wherein the method further comprises:
  receiving at the enterprise server a signal representing data in response to the second request; and
  sending from the enterprise server a signal representing at least a portion of the data to the remote user.

67. The media of claim 66, wherein the first secure resource includes a Web site, and the data is hypertext mark-up language.

* * * * *

UNITED STATES PATENT AND TRADEMARK OFFICE
CERTIFICATE OF CORRECTION

PATENT NO. : 7,412,720 B1
APPLICATION NO. : 10/004301
DATED : August 12, 2008
INVENTOR(S) : Frey et al.

It is certified that error appears in the above-identified patent and that said Letters Patent is hereby corrected as shown below:

In column 5, line 21, delete "accompa- nying" and insert -- accompanying --, therefor.

In column 6, line 40, delete "3 10" and insert -- 310 --, therefor.

In column 7, line 11, delete "access." and insert -- access (step 406). --, therefor.

In column 7, line 13, delete "FIG. 5," and insert -- FIG. 3, --, therefor.

In column 7, line 14, delete "access," and insert -- access, and --, therefor.

In column 7, line 16-19, delete "304, and that SSO product 532A requires an SSO token to access stock quotes server 506. This determination is made in a method similar to that described above with respect to FIG. 3." and insert -- 304. --, therefor.

In column 7, line 44, delete "well-know" and insert -- well-known --, therefor.

In columns 9-10, line 58-67 and 1-3, after "use." delete "Based on the request, Web server 310 identifies the resources requested by the user. For each requested resource, Web server 310 determines the type of security credential required for access (step 616). Assume that the user request requires content from all of resource servers 302, 304, and 506. Referring to FIG. 5, Web server 310 determines that CRM server 302 requires no security credentials for access, that authenticator 324 requires HTTP 1.1 basic authentication security credentials to access email server 304, and that SSO product 532A requires an SSO token to access stock quotes server 506. This determination is made in a method similar to that described above with respect to FIG. 3." and insert the same on col. 9, line 59, as a new paragraph.

In column 9, line 61-62, delete "access (step 616)." and insert -- access. --, therefor.

In column 10, line 52, before "policy" delete "a".

In column 12, line 38, delete "Programmable" and insert -- programmable --, therefor.

In column 12, line 39, delete "Programmable" and insert -- programmable --, therefor.

In column 18, line 12, in claim 38, after "a" delete "the".

CERTIFICATE OF CORRECTION (continued)
U.S. Pat. No. 7,412,720 B1

In column 19, line 29, in claim 47, delete "claim 33," and insert -- claim 46, --, therefor.

In column 20, line 29, in claim 54, delete "single-sign- on" and insert -- single-sign-on --, therefor.

Signed and Sealed this

Sixteenth Day of March, 2010

David J. Kappos
*Director of the United States Patent and Trademark Office*